G. W. WALKER.
Cooking Stove.

No. 35,962.  Patented July 22, 1862.

Witnesses:
Arthur Neill
J. R. Bampton

Inventor.
Geo. W. Walker

UNITED STATES PATENT OFFICE.

GEORGE W. WALKER, OF BOSTON, MASSACHUSETTS.

IMPROVEMENT IN COOKING-STOVES.

Specification forming part of Letters Patent No. 35,962, dated July 22, 1862.

*To all whom it may concern:*

Be it known that I, GEORGE W. WALKER, a citizen of the United States of America, and a resident of Boston, in the county of Suffolk and State of Massachusetts, have invented a new and useful or Improved Cooking-Stove; and I do hereby declare the same to be fully described in the following specification, and represented in the accompanying drawings, of which—

Figure 1:
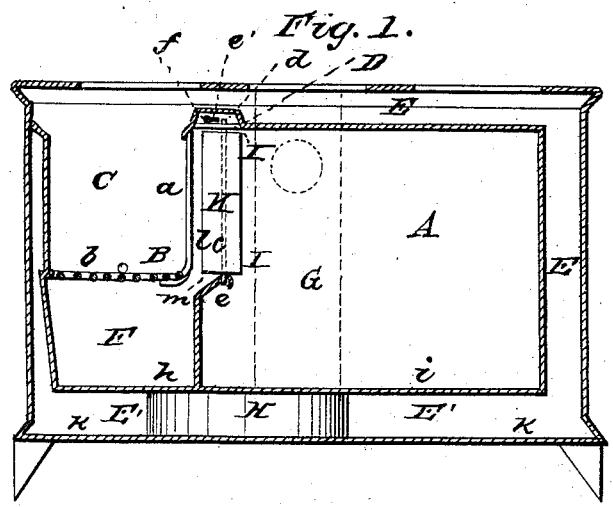
Figure 2:
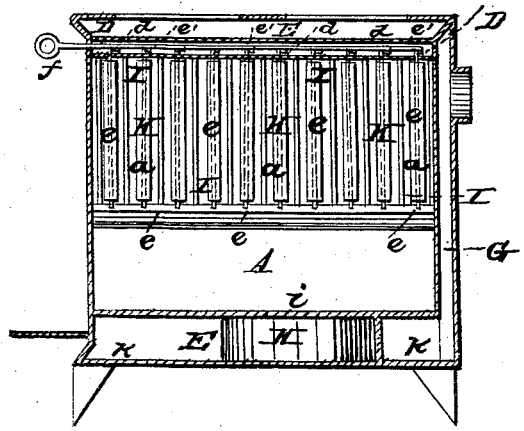
Figure 3:
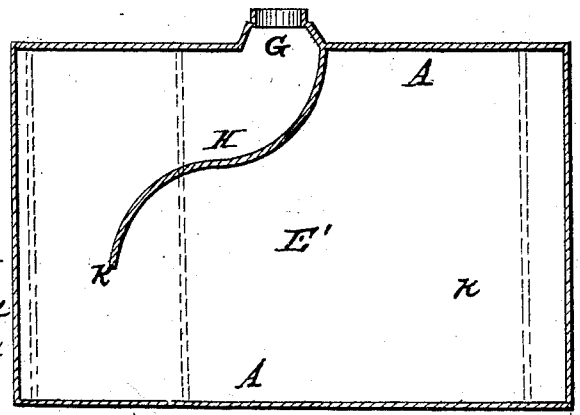

Figure 1 is a longitudinal and vertical section, and Fig. 2 a transverse and vertical section, of the said stove. Fig. 3 is a horizontal section taken through the flue-space underneath the oven and ash-pit.

By means of the above-mentioned stove not only can baking be carried on in a closed oven, but roasting can be effected by direct radiation of heat and light from the fire into the oven. Thus my stove possesses not only the advantages of ordinary cooking-stoves provided with close ovens, but those of a common tin kitchen set up in front of a grate and separate from the stove.

It is well known that the tin kitchen is exclusively a roasting apparatus, and that an oven is generally designed for baking by means of heat without light; but in my stove a joint of meat or an animal when in the oven may be either baked or roasted, or the oven may be employed for baking purposes only, as circumstances may require.

In carrying out my invention that side of the oven A which is next to the grate B of the fire-place C should be constructed with an opening, I, which may be about equal in area to that of the rear face of the vertical part $a$ of the grate, or may be less or larger, as circumstances may require. This opening I is to be provided with a register, K, which may be composed of a series of valves or shutters, $e\ e\ e$, arranged parallel to each other and vertically, and so that when the register is closed each may lap on that one which is next to it. Each valve or shutter has journals $d\ e$, which enter suitable bearings. Each one of the upper series of journals, $d\ d\ d$, has a crank, $e'$, extended from it and having its wrist passed through a horizontal slider, $f$, which is arranged in a chamber, D, situated on the top of the oven and between the oven and a flue-space, E, which extends from the fire-place and directly across the top of the oven, and from thence is carried down alongside the rear side of the oven, from whence it passes underneath both the oven and the ash-pit F. By moving the slider $f$ longitudinally in one direction it will cause the register to be closed, or when moved in the opposite direction the slider will open the register. When the register is open, the rays of light and heat from the fire within the fire-place C will be caused to be radiated directly between the grate-bars and into the oven, in which case an article placed in the oven may be roasted.

The grate B, I make in two parts, $a\ b$, the lower or horizontal one (viz., $b$) being so applied to the stove-case as to be capable of being rotated in order to discharge clinkers or coals into the ash-pit.

Near one of the front corners of the case a vertical flue, G, is led upward on one side of the stove, and has a partition, H, extended from it into that part of the space E' which is underneath the oven and ash-pit. The partition H also extends from the bottom plate, K, of the stove up to the plates $i\ h$ of the oven and ash-pit, and, furthermore, it goes into the space under the ash-pit in manner as represented in Figs. 1 and 3. By this arrangement the heat will be effectually and evenly consumed against the entire under surface of the bottom of the oven, and besides going under the oven the smoke and heat will pass under the ash-pit, and thereby aid in heating the ash-pit and draft of air which may pass through the same into the grate.

The oven is arranged with respect to the grate so that there may be a space, $l$, between the register and the grate. Such space at its lower end is to communicate freely with or open into the ash-chamber F. An inclined plane or chute, $m$, (arranged with respect to the space $l$, as shown in Fig. 1,) serves to facilitate the passage into the ash-chamber of any ashes or coals which may be discharged between the grate-bars of the part $a$ of the grate. The space $l$ serves to prevent the register from becoming choked or interrupted in its operations by coals or ashes which may fall from the said part a.

I claim—

1. Constructing the oven so as to open toward the fire-place grate, and providing the opening with a register or means by which heat and light from the fuel, when on fire in the grate, may either be radiated directly into the oven or excluded therefrom, substantially as and for the purposes above specified.

2. The arrangement and combination of the register-slide chamber D, the register K, the open grate a, oven A, and the flue-space about the oven, the whole being substantially as above described.

GEO. W. WALKER.

Witnesses:
F. P. HALE, Jr.,
J. R. BAMPTON.